No. 874,366. PATENTED DEC. 17, 1907.
J. LAYFIELD & A. V. CRISP.
CEMENT BLOCK MOLDING MACHINE.
APPLICATION FILED MAR. 30, 1907.
2 SHEETS—SHEET 1.
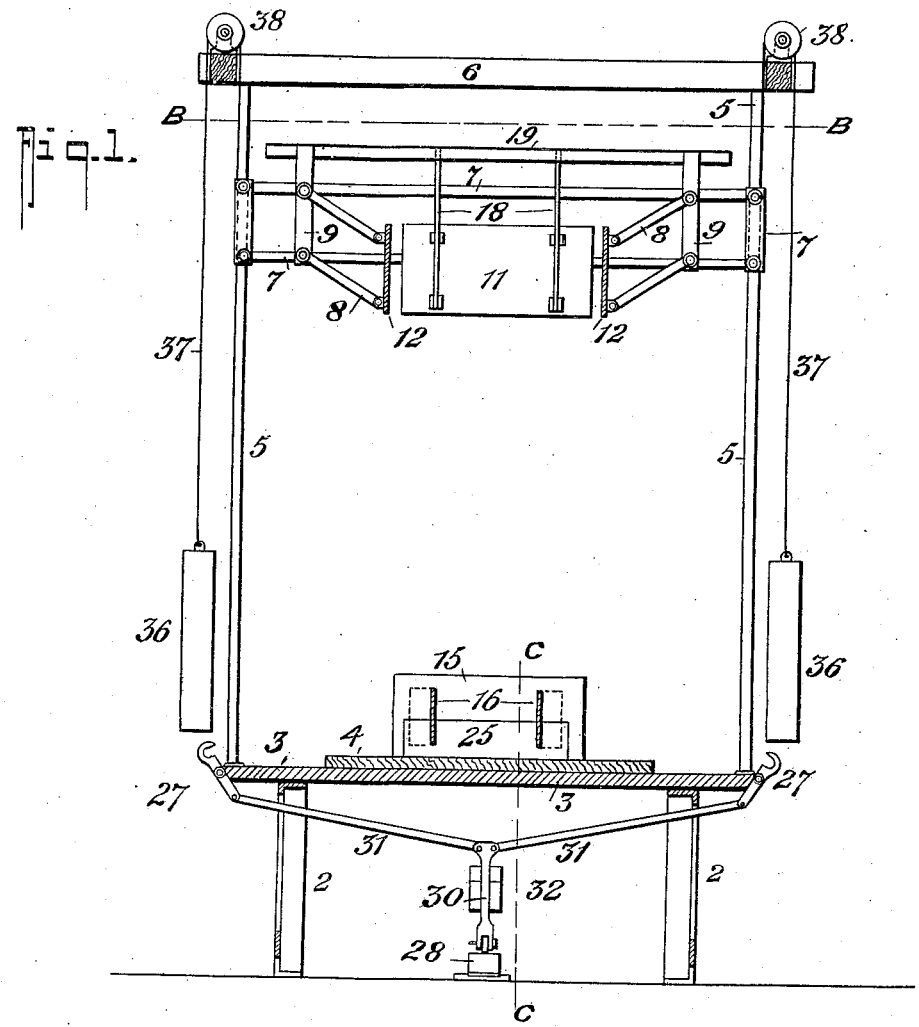
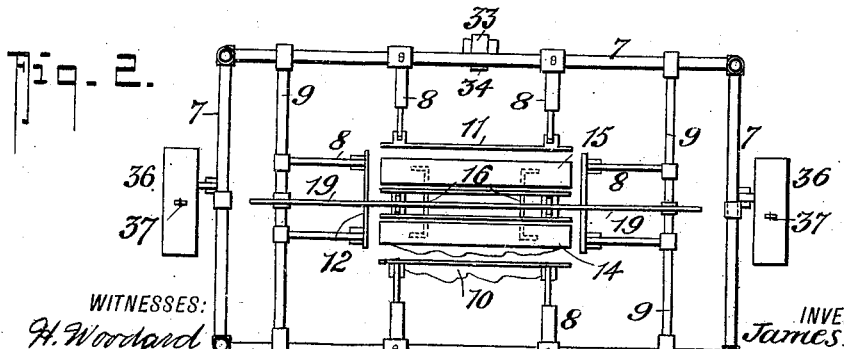
WITNESSES:
H. Woodard
John T. Schrott
INVENTORS
James Layfield
Albert V. Crisp
BY
Fred G. Dieterich
ATTORNEY

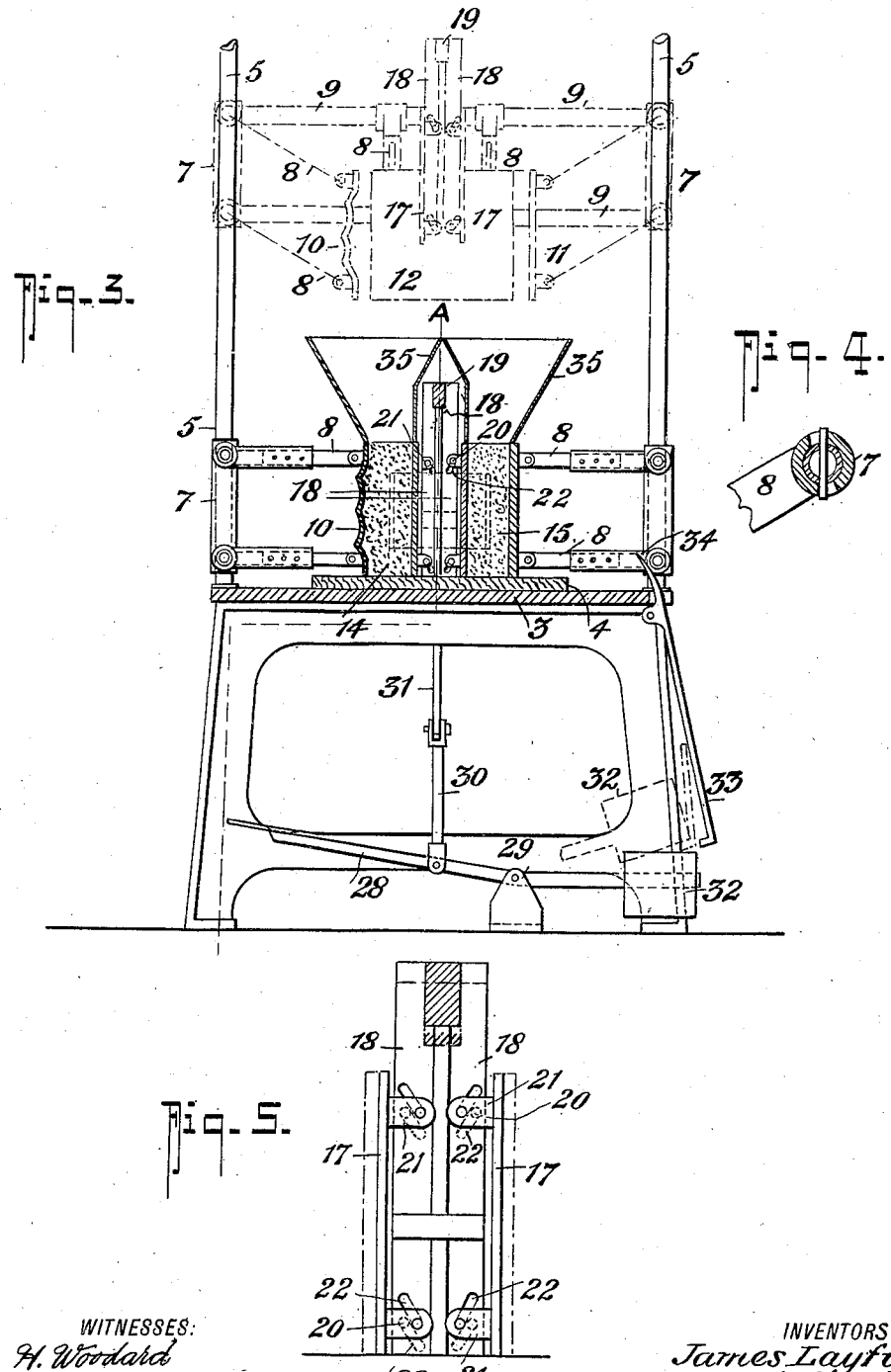

UNITED STATES PATENT OFFICE.

JAMES LAYFIELD AND ALBERT V. CRISP, OF VANCOUVER, BRITISH COLUMBIA, CANADA, ASSIGNORS TO VICTOR CEMENT BLOCK & MACHINE CO. LTD. A CORPORATION.

CEMENT-BLOCK-MOLDING MACHINE.

No. 874,366.　　　　　Specification of Letters Patent.　　　　　Patented Dec. 17, 1907.

Application filed March 30, 1907. Serial No. 365,615.

*To all whom it may concern:*

Be it known that we, JAMES LAYFIELD and ALBERT V. CRISP, citizens of the Dominion of Canada, residing at Vancouver, in the Province of British Columbia, Canada, have invented a new and useful Improvement in Cement-Block-Molding Machines, of which the following is a specification.

This invention relates to a machine for molding cement building blocks which, although particularly designed for forming a patented cement block wherein the outer and inner wall members are bonded together by sheet metal ties embedded in the cement of the wall members, is equally applicable for molding cement blocks of ordinary construction.

The invention comprises chiefly the means whereby the elevation of the frame to which the mold plates are attached, will, in the act of elevation and before the plates themselves move up, first withdraw from the faces of the block the several plates between which the block has been molded.

The invention is fully described in the following specification and illustrated in the drawings by which it is accompanied, in which:

Figure 1 is a vertical section of the machine on a plane parallel to the front, indicated by the line A A in Fig. 3, showing a molded block on the base plate and the mold plates withdrawn therefrom and elevated. Fig. 2, a sectional plan of the same on the line B B in Fig. 1, Fig. 3, a vertical section to an enlarged scale through the lower part of the machine on the line C C in Fig. 1, Fig. 4, an enlarged detail of the attachment to the members of the mold plate carrying frame of the links which carry the mold plate, and Fig. 5 is a detail to an enlarged scale of the means by which the plates which form the core space of the block are withdrawn before being elevated, the dotted lines showing the core in an expanded position.

The machine consists of a base frame 2 supporting at a convenient height from the floor level a table 3 which carries the mold base plate 4 and the superstructure. From each corner of the table 3 columns 5 extend upward and are connected above by a top frame 6. These columns 5 form guides on which an open rectangular mold plate carrying frame 7 is vertically movable, to the front back and side members of which frame 7 are pivotally connected by parallel links 8 the front back and end plates 10, 11 and 12 of the mold. The parallel links 8 are of equal length and are pivotally connected to the plates 10, 11 and 12 as well as to the members of the frame so that they will move in perpendicular and parallel planes.

The members 9 of the frame 7 to which the links 8 of the end plates 12 are mounted are horizontally adjustable on the front and back members of the carrying frame so that they may be set to varying lengths of mold plates. Similar variation of the width of the mold from front to back being attained by slidable adjustment in the length of the links 8 of these plates, as shown in Fig. 3. The movement of these links on the members of the frame 7 is limited by any suitable check such as represented in Fig. 4 where a pin is shown as passing through the frame members 7 or 9 and an elongated aperture is provided therefor in the eye of the links 8.

With this construction, when the carrying frame 7 is at the lower limit of its movement with the links 8 approximately horizontal as represented in Fig. 3, the plates of the mold are closed to the desired dimension of block and when, after the block is formed, the mold plate carrying frame is elevated, before the lower edges of the mold plates 10, 11 and 12 lift from off the mold base plate 4, they will, by the angling of the links 8, be withdrawn from the faces of the molded block which is represented in the drawings by 14 and 15.

The plates 17 which form the core space of the block are carried by members 18 depending from a bar 19 supported on the carrying frame 7. The plates 17 are attached to the members 18 (see Fig. 5) by pins 20 through lugs 21 on the back of the plates which pins pass through elongated apertures 22 in the members 18 the apertures being angled downwards toward the mid-plane so that as the carrying frame 7 is elevated the plates 17 will remain on the mold base plate 4 and through the contact of the pins 20 in the incline of the elongated apertures 22 will be withdrawn from the molded face of the core space. Conversely when the mold plate carrying frame is lowered into its position for molding a block as soon as the lower edges of the plates 17 bear on the mold base plate 4 the pins 20 will travel in the elongated apertures 22 and the plates will be horizontally forced outward to their required dimension of core space. Variation of the width of the core space may be attained by packing between the depending members 18 at their attachment to the bar 19 and setting the tie 23 to a different pitch.

Resting on the upper surface of the mold base plate 4 between the core plates 17 is a support 25 to sustain, while the cement is being tamped in, the sheet metal ties 16 which connect the outer and inner wall members 14 and 15 of the blocks.

The weight of the mold plate carrying frame and its depending mold plates, etc., is counterbalanced by weights 36 connected to the carrying frame 7 by flexible wire ropes 37 passing over sheaves 38 on the top frame 6 of the machine.

The mold plate carrying frame 7 is automatically secured in position upon the mold base plate 4 by latches 27, which latches, in the machine illustrated, are operated to release the frame 7 and allow it to be elevated, by a treadle lever 28 fulcrumed at 29 and connected by a vertical link 30 and toggle links 31 to the lower ends of the latches 27 so that as the treadle is depressed the latches are withdrawn and the carrying frame is free to be pushed up or to rise of its own accord if the counterweight predominates. On an extension of the treadle lever 28 is a counterweight 32 which will when free move the latches to the closed position, and a lever catch 33 holds the weight up until the descent of the frame 7 by engaging the upper end 34 of the lever catch 33 permits the weight 32 to fall and operate the latches 27 to secure the mold plate carrying frame to the table of the machine with the mold plates closed to the desired dimension of block.

In the operation of the machine the block ties 16 are placed in their support 25 and the mold plate carrying frame is drawn down and latched to the table, in which position the mold plates in the manner described are forced together to form the mold and the core plates 17 pressed outward to form the core space. A hopper 35 is then placed on the top of the mold and the sand and cement is filled in and tamped in the usual manner by hand, pneumatic tamping tools being used if preferred. The hopper is then removed, the treadle depressed to release the latches 27 and the mold plate carrying frame 7 lifted: in which act of lifting the mold plates 10, 11 and 12 and the core plates 17 are first withdrawn from the surfaces of the block which they have respectively molded.

Having now particularly described our invention and the manner of its operation we hereby declare that what we claim as new and desire to be protected in by Letters Patent, is:

1. In a cement block mold, the combination with a mold base plate, of a frame vertically movable there-over, plates for forming the side and end faces of the mold and the core space, means for connecting all of the mold plates to the mold carrying frame so that as the frame is lifted upward off the mold base plates, the mold plates will first be with-drawn from the faces of the block which has been molded, and means for lifting the mold carrying frame upward at times, substantially as shown and described.

2. In a cement block mold, the combination with a mold base plate of a frame vertically movable thereover, plates for forming the side and end faces of the mold and the core space, and means for so connecting the wall and core plates of the mold to the mold plate carrying frame that as the frame is lifted the plates are first withdrawn backward from the faces of the block which they have molded.

3. In a cement block mold, the combination with a table suitably supported at a convenient height from the floor and carrying the base plate for the mold, of guide columns extending upward from the table and suitably connected at the top, a mold plate carrying frame vertically slidable on the columns, front back and side mold plates each pivotally connected by parallel links to the carrying frame, a central frame supported on the carrying frame and having elongated apertures inclined downward toward the midplane of the core space and means for connecting the core plates by pins through the elongated apertures so that when the carrying frame is lifted the core plates will be drawn back from the faces of the core space to the mid-plane of the same.

4. In a cement block mold, the combination with a table suitably supported at a convenient height from the floor and carrying the mold base plate, guide columns extending upward from the table and suitably connected at the top, an open rectangular frame vertically slidable on the columns, mold plates connected by equal and parallel links pivotally connected to the rectangular frame and to the mold plates, means for limiting the pivotal movement of the links at the horizontal position and at an angular position below such, means for adjusting the length of the links, a central frame secured to the rectangular frame and having downwardly depending members, core plates secured by pins to the depending members in such a manner that as the frame is lifted the core plates will be drawn toward the mid-plane, means for counterweighting the rectangular frame and its connected parts means for securing the frame to the table of the machine, and means for releasing such securing means.

5. In a cement block mold, the combination with a mold base plate, of a frame vertically movable there-over, plates for forming the side and end faces of the mold and the core space, means for connecting all of the mold plates to the mold carrying frame so that as the frame is lifted upward off the mold base plates, the mold plates will first be with-drawn from the faces of the block which has been molded, means for lifting the mold carrying frame upward at times, means for normally holding said lifting means locked, and manually operated means for releasing the locking means, substantially as shown and described.

In testimony whereof we have signed our names to this specification in the presence of two subscribing witnesses.

JAMES LAYFIELD.
ALBERT V. CRISP.

Witnesses:
ROWLAND BRITTAIN,
CLIVE S. CARMAN.